Figure 6:
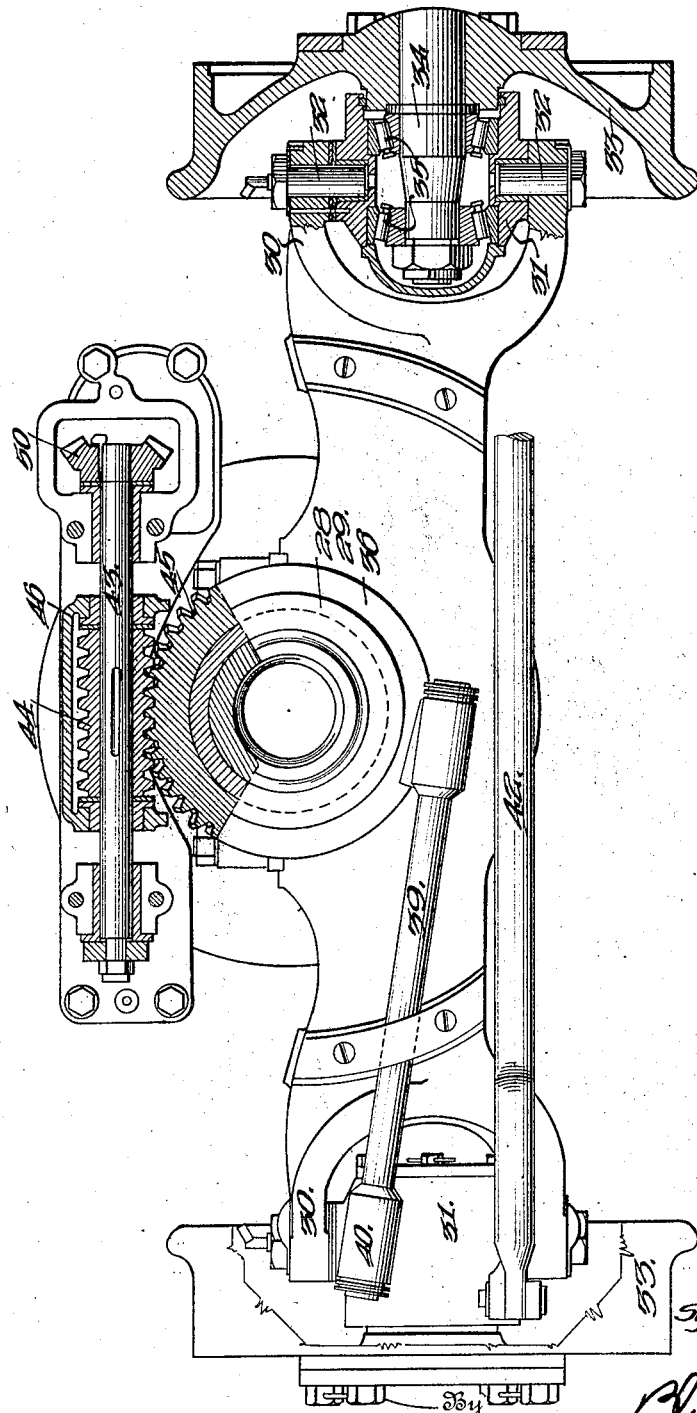

Nov. 20, 1923.  
S. H. HUNT  
1,474,527  
STEERING MECHANISM FOR SELF PROPELLED VEHICLES  
Filed Sept. 24, 1921   9 Sheets-Sheet 1
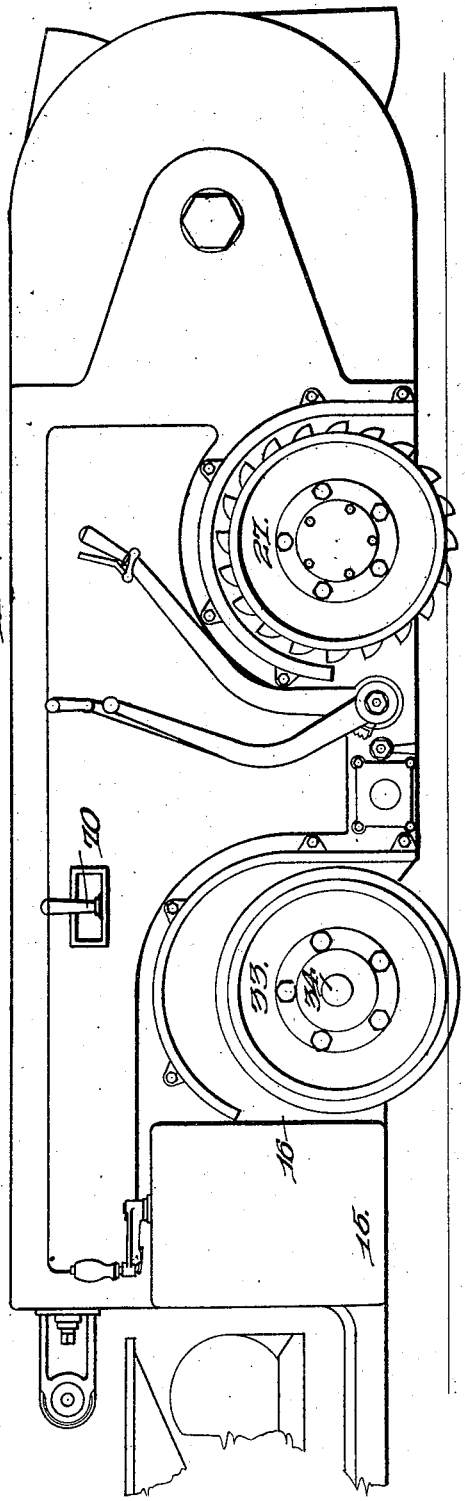
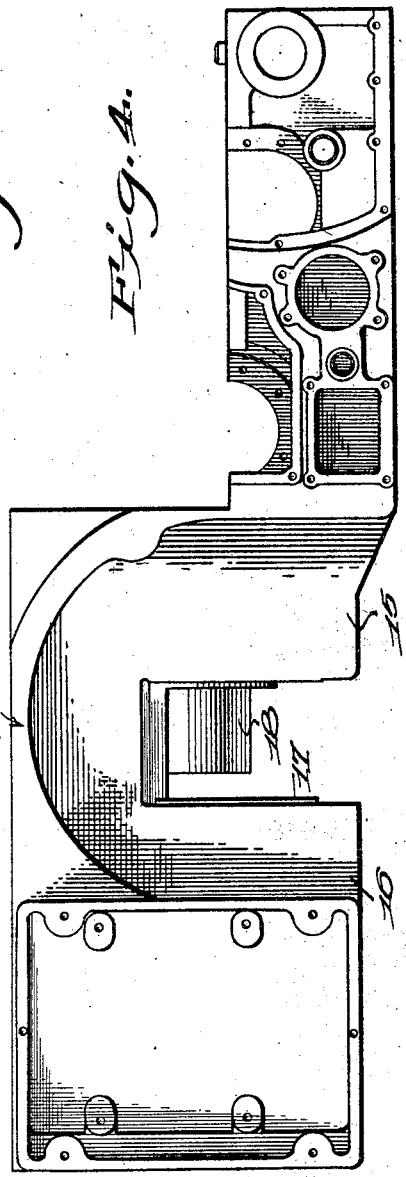
Inventor,
Sylvester H. Hunt,
By
Attorney

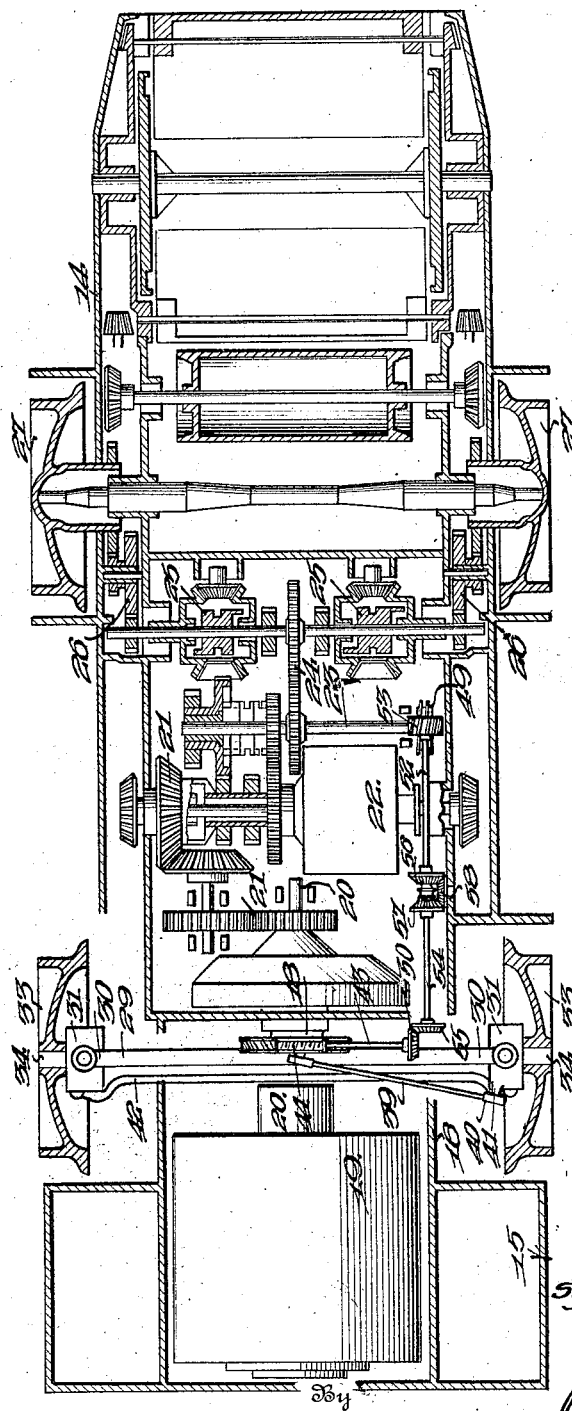

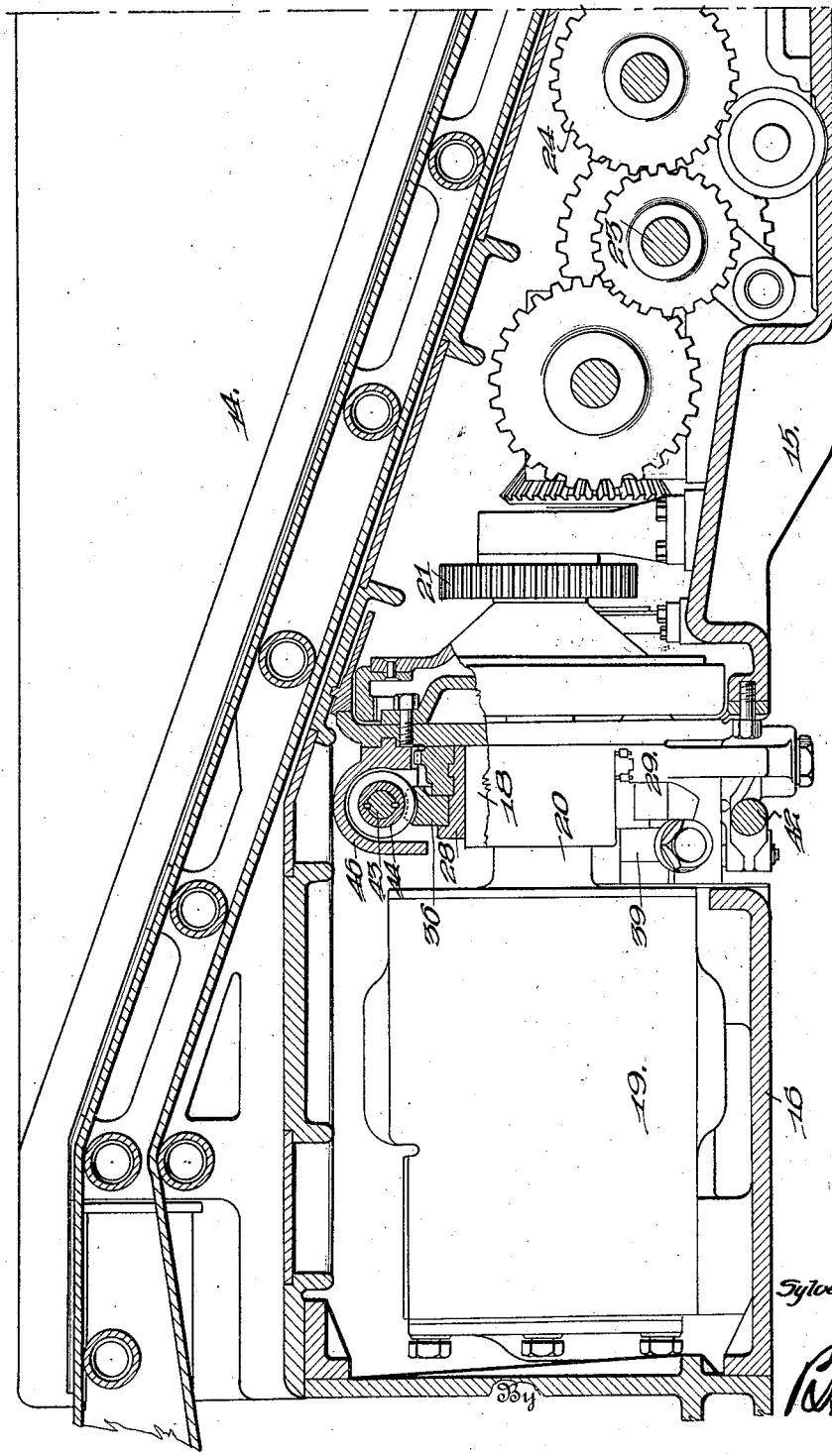

Nov. 20, 1923.
S. H. HUNT
1,474,527
STEERING MECHANISM FOR SELF PROPELLED VEHICLES
Filed Sept. 24, 1921   9 Sheets-Sheet 4
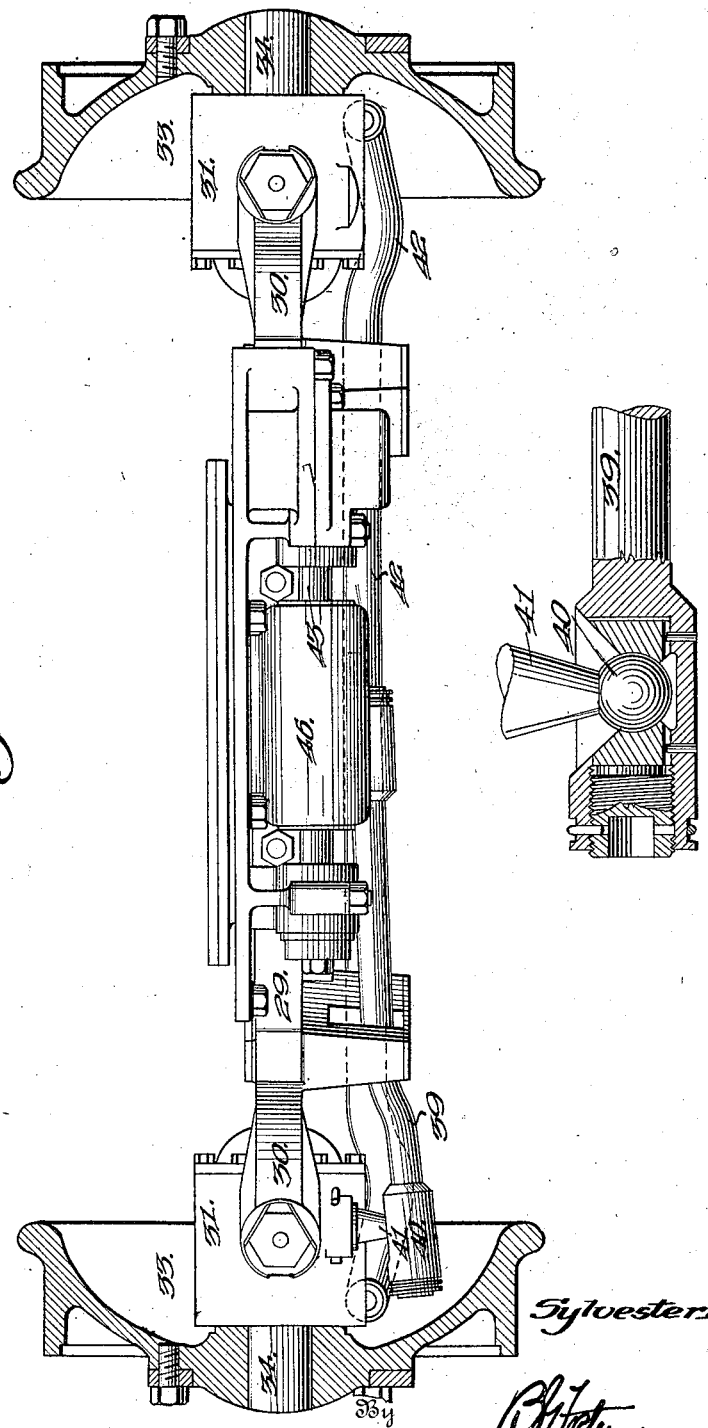
Inventor,
Sylvester H. Hunt,
By
Attorney Nov. 20, 1923.                                              1,474,527
                       S. H. HUNT
        STEERING MECHANISM FOR SELF PROPELLED VEHICLES
              Filed Sept. 24, 1921        9 Sheets-Sheet 5

Inventor,
Sylvester H. Hunt,
By
          Attorney

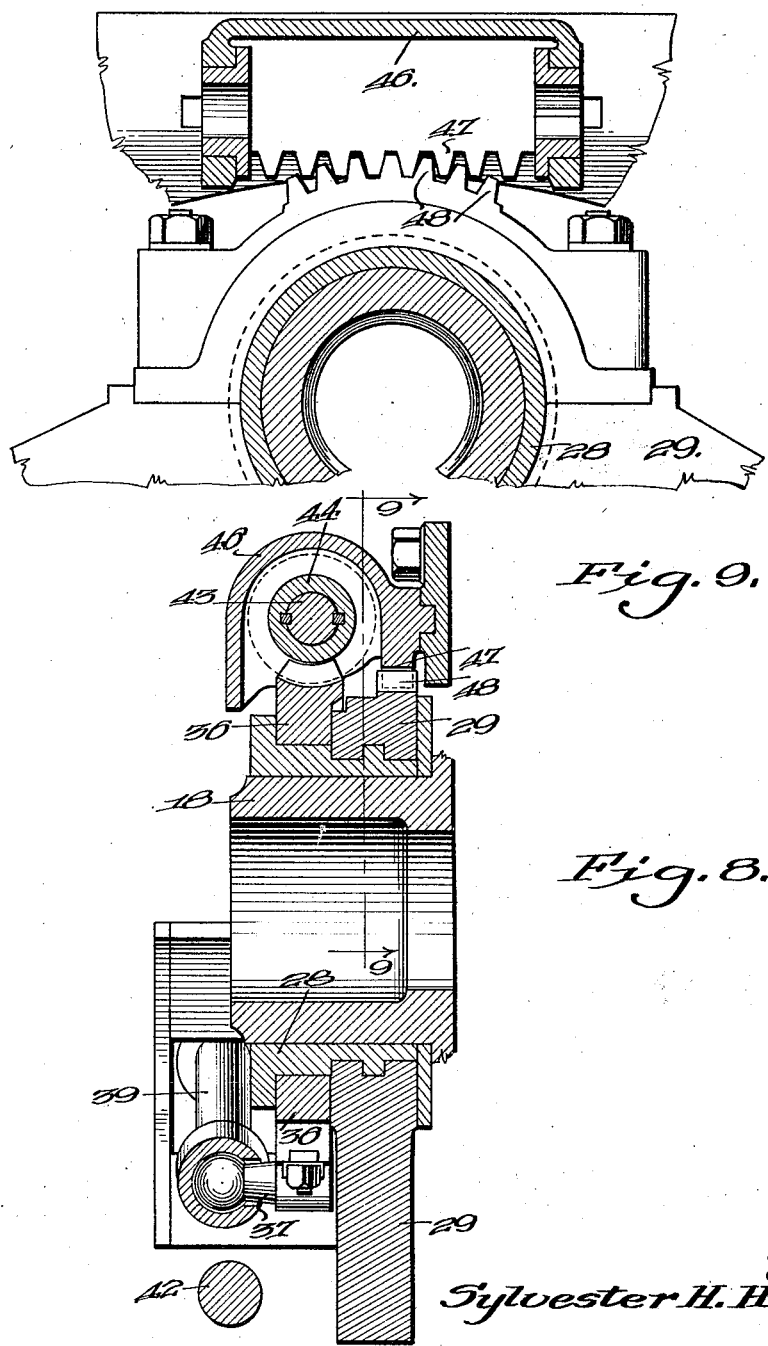

Nov. 20, 1923.

S. H. HUNT 1,474,527

STEERING MECHANISM FOR SELF PROPELLED VEHICLES

Filed Sept. 24, 1921     9 Sheets-Sheet 7

Inventor,
Sylvester H. Hunt,

By

Attorney

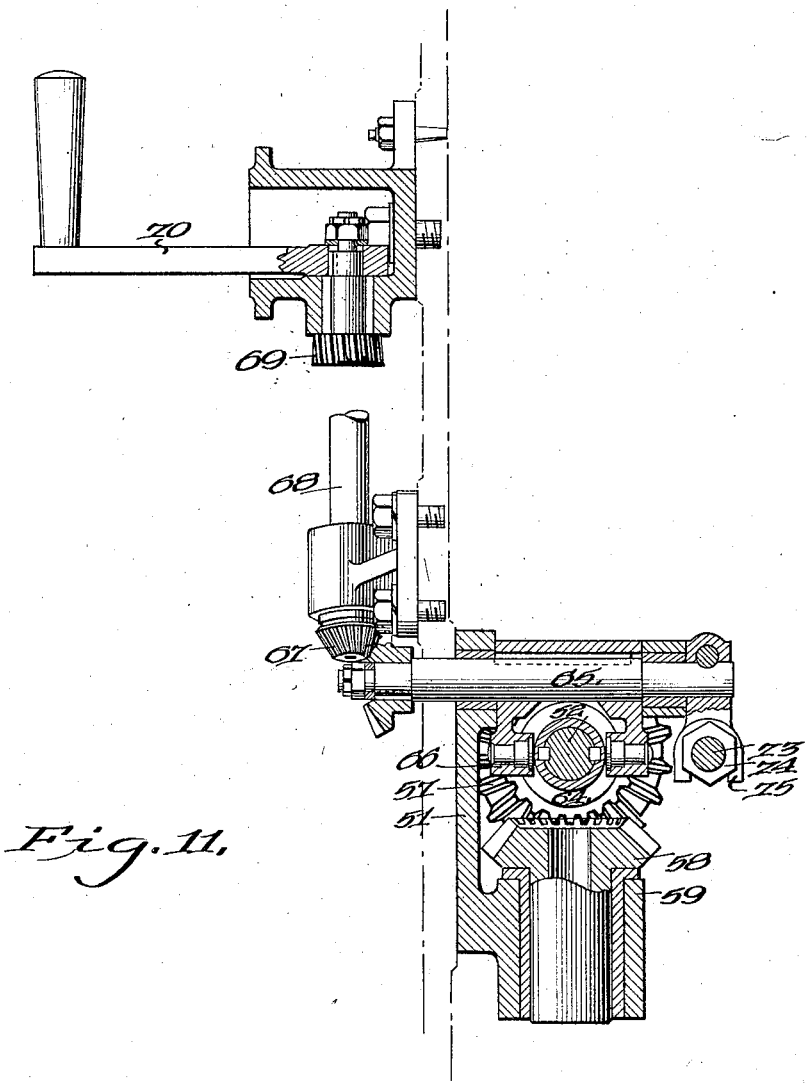

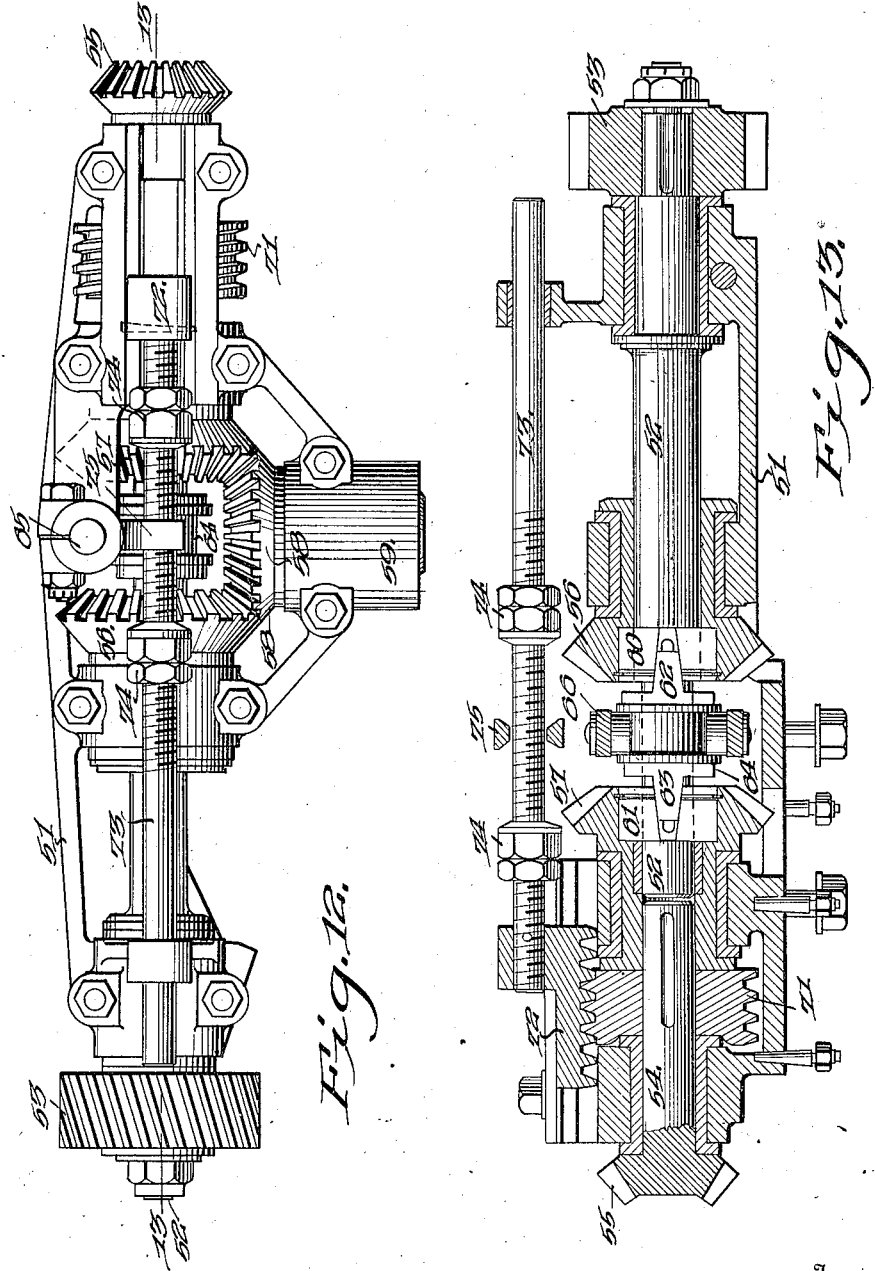

Patented Nov. 20, 1923.

1,474,527

UNITED STATES PATENT OFFICE.

SYLVESTER H. HUNT, OF MILWAUKEE, WISCONSIN.

STEERING MECHANISM FOR SELF-PROPELLED VEHICLES.

Application filed September 24, 1921. Serial No. 502,882.

*To all whom it may concern:*

Be it known that I, SYLVESTER H. HUNT, a citizen of the United States, residing at Milwaukee, in the State of Wisconsin, have invented certain new and useful Improvements in Steering Mechanism for Self-Propelled Vehicles, of which the following is a specification.

The present invention relates to steering mechanism for power-driven vehicles, and while primarily intended as a part of a car-loading apparatus may be employed on other self-propelled mechanisms.

An embodiment is illustrated in the accompanying drawings, wherein:—

Figure 1 is a side elevation of a loading apparatus equipped with the steering mechanism, Figure 2 is a horizontal sectional view therethrough partly diagrammatic in its character, Figure 3 is a vertical sectional view through the rear portion and on an enlarged scale, Figure 4 is a side elevation of the rear section of the supporting frame, Figure 5 is a top plan view of the support for the steering wheels, said wheels being shown in horizontal section, Figure 6 is a view partly in vertical section and partly in elevation of the mechanism shown in Figure 5.

Figure 7 is a detail view of one of the steering knuckles, Figure 8 is a cross sectional view through the mounting for the steering wheel axle and the associated mechanism, Figure 9 is a sectional view thereagainst on the line 9—9 of Figure 8, Figure 10 is a view in elevation of the controlling means, Figure 11 is a sectional view taken generally on the line 11—11 of Figure 10, Figure 12 is a rear elevation of the controlling mechanism, Figure 13 is a longitudinal sectional view on the line 13—13 of Figure 12.

Inasmuch as the present invention relates to steering mechanism, and while the disclosed embodiment is a part of ore loading apparatus, it is believed to be unnecessary to go into said apparatus in detail. The same constitutes the subject-matter of a co-pending application Serial No. 473,337, filed May 28, 1921. The structure, as a whole, comprises a main frame designated generally by the reference numeral 14, said main frame including a rear section 15 shown in detail in Figure 4. This rear section includes a motor housing 16, and also is provided with a transverse recess 17 into which projects a longitudinally disposed spindle element 18. A motor 19 is located in the housing 16, and has a shaft 20 that passes through the spindle 18. Through suitable gearing 21 and clutch mechanism 22 motion is imparted from the motor shaft 20 to a transverse shaft 23. From the shaft 23 through gearing 24, clutch mechanism 25 and gearing 26 front supporting and drive wheels 27 are operated for propelling the apparatus either forwardly or backwardly. The details of this driving mechanism are fully set forth in the aforesaid application.

Journaled on a wear collar 28 on the spindle 18 is a transversely disposed axle 29 that operates in the recess 18, this axle terminating in yokes 30. Housings 31 are located in the yokes and are pivotally mounted therein by means of upright pins 32 passing through the upper and lower arms of the yokes and engaging in said housings. Inwardly dished steering wheels 33, located at the outer ends of the housings 31, have inwardly extending stub shafts 34 that are located in said housings 31, and are provided therein with suitable rolling bearings 35. The wheels, it will be noted by reference to Figures 5 and 6, encircle their mountings and act as shields therefor.

Rotatably mounted on the bushing 28 at one side of the axle 29 is a crank ring 36, the crank pin 37 of which (illustrated in Figure 8) has connected thereto one end of a link 39. The other end of this link 39 has a ball and socket connection 40 with a steering knuckle 41 mounted on one of the housings 31. The two housings moreover are connected by a coupling rod 42 so that the two steering wheels and their mountings will swing together and will be operated upon the turning of the crank ring 36.

Journaled above the spindle member 18 and transversely thereof, is a shaft 43 to which is slidably keyed a worm 44. This worm is in mesh with worm teeth 45 formed on the upper side of the crank ring 36. The sliding movement of the worm 44 on the shaft 43 is controlled by a housing 46, also slidable on the shaft 43 and enclosing said worm 44. This housing 46 is provided with a rack 47 in mesh with a gear segment 48 formed upon the hub portion of the swinging axle 29.

The shaft 23, which as already explained is driven from the motor 19, is provided at one end with a gear 49 and the shaft 43 is provided at one end with a gear 50. These two gears are adapted to be operatively connected through the following controlling mechanism, shown more particularly in Figures 10–13. A bracket 51 supports a driving shaft 52, having a gear 53 in mesh with the gear 49 of the shaft 23, and a driven shaft 54 journaled in the bracket 51 in line with the driving shaft 52, has a terminal gear 55 in mesh with the gear 50 of the shaft 43. Loosely journaled on the shaft 52 is a beveled gear 56, and keyed to the shaft 54 is an oppositely disposed beveled gear 57 that surrounds the inner end of the shaft 52. An idler gear 58, suitably journaled in a box 59 of the bracket 51, is in mesh with the two gears 56 and 57. The opposing ends of the gears 56 and 57 are hollowed to receive expansible clutch rings 60 and 61 that surround the shaft 52 and these rings are adapted to be expanded by oppositely disposed wedges 62 and 63 carried by a peripherally grooved head 64 slidably mounted on but fixed to rotate with the shaft 52. As shown in Figure 13 the wedges 62 and 63 are entered between the ends of the rings 60 and 61. A transversely disposed shaft 65 carries a yoke 66 engaged in the peripheral groove of the head 64, and this shaft is geared, as shown at 67, to another shaft 68 mounted on the frame and geared as illustrated at 69 to a hand crank 70 that projects from one side of the machine, illustrated in Figure 1.

The driven shaft 54 is also provided with a worm 71 in mesh with a reciprocatory rack bar 72 slidably mounted in the bracket 51 and fixed to this rack bar is a reciprocatory rod 73 on which are adjustably threaded abutments 74. Between these abutments is located a yoke 75 that is fixed to the rock shaft 65.

Assuming the shaft 23 in motion and the clutch head 64 in its central position, the clutch rings 60 and 61 will be contracted and the gear wheels 56 and 57 idle. If the steering wheels 33 are now straight and it is desired to turn them it is only necessary for the operator to swing the lever 70 in one direction or the other. When swung in one direction the clutch head 64 as shown in Figure 13 will be moved to the right. This will cause the wedge 62 to expand the ring 60 and clutch the gear wheel 56 to the driving shaft 52, and said gear wheel 56 will thus be driven, imparting rotation through the idler 58 to the gear 57, and thus rotating the driven shaft 54. Motion will thus be imparted through the gears 55 and 56 to the shaft 43 and the worm 44 will be rotated. As a consequence the crank ring 36 will be turned, thus imparting longitudinal movement to the link 39 and causing the mountings for the steering wheels 33 to be turned in one direction. If the operator does not manually shift the clutch head 64 to release the gear 56, the rotation of the driven shaft 54 will cause the rotation of the worm 71, and this will impart a longitudinal movement to the rack bar 72 until one of the abutments 74 engages the yoke 75, which will turn the rock shaft 65, and through the medium of the yoke 66 will bring the clutch head 64 to its neutral position.

If the operating lever 70 is thrown in the opposite direction to that above described the wedge 63 will enter the ring 61 and expand the same, thereby connecting the driving shaft 52 directly to the driven shaft 54 through the medium of the gear 57, and said driven shaft will be rotated in an opposite direction to that above described. The steering wheel mountings will thus be turned in an opposite direction, and unless stopped, the clutch will again be automatically thrown out by the opposite abutment 74. As a consequence any danger of turning the wheels too far will be avoided.

The mounting of the axle 29 obviously permits the wheels to follow the contour of the ground or track, and accommodate themselves to any unevenness, but as this necessitates the corresponding swinging of the link 39 with the axle and the turning of the crank ring 36, it is necessary to allow the worm 44 to shift along the shaft when said ring 36 turns. At the same time this shifting movement of the worm 44 on the shaft 43 must be limited as otherwise the rotation of the shaft 43 would simply cause the worm to be threaded along the same. This movement is therefore permitted and yet controlled by the housing 46 which is shiftable, but is itself controlled through the medium of the rack 47 and gear segment 48, the latter of which is a part of and therefore turns with the axle in its tilting movements.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. In apparatus of the character set forth, the combination with a supporting frame, and a motor thereon, of a motor shaft driven thereby, an axle transversely journaled on the frame substantially concentric to the shaft, and supporting wheels on the axle.

2. In apparatus of the character set forth, the combination with a supporting frame having a longitudinally disposed spindle element, of a motor on the frame, a drive shaft operated by the motor and extending through the spindle element, a transverse axle journaled on the spindle, and wheels on the axle.

3. In apparatus of the character set forth, the combination with a supporting frame and a motor thereon, of a motor shaft driven thereby, supporting wheels driven from said driving shaft, a transverse axle journaled on the frame on an axis substantially coaxially with the shaft, steering wheels on the axle, and means for swinging said wheels.

4. In apparatus of the character set forth, the combination with a supporting frame having a longitudinally disposed spindle element, of a motor on the frame, a drive shaft operated by the motor and extending through the spindle element, a transverse axle journaled on the spindle, wheels having pivotal mountings on the axle, and means for swinging said wheels.

5. In apparatus of the character set forth, the combination with a supporting frame having a longitudinally disposed spindle element, of a motor on the frame, a shaft driven by the motor and extending through the spindle element, drive and supporting wheels on the front portion of the frame, gearing for connecting the shaft to the wheels, a transverse axle journaled on the spindle element, steering wheels pivotally mounted on the axle, and means for swinging said wheels.

6. In apparatus of the character set forth, the combination with a supporting frame, of a transverse axle journaled thereon, steering wheels having pivotal mountings on the axle, mechanism for turning the mountings including operating means disposed substantially concentrically to the pivot axis of the axle, drive wheels journaled on the frame, a motor, and driving mechanism between the motor and drive wheels, including a shaft disposed concentrically to the pivot axis of the axle.

7. In apparatus of the character set forth, the combination with a supporting frame, of a transverse axle journaled thereon, steering wheels having pivotal mountings on the axle, mechanism for turning the mountings including operating means journaled on the axle mounting, and means for propelling the frame, including a drive shaft disposed axially to the axle and operating means.

8. In apparatus of the character set forth, the combination with a supporting frame having a spindle element, a transverse axle pivoted on the spindle element, steering wheels having pivotal mountings on the axle, means for turning said wheels including operating means connected to the mountings and journaled on the spindle element, and propelling mechanism for the frame including a drive shaft passing through the spindle element.

9. In apparatus of the character set forth, the combination with a supporting frame having a spindle element, a transverse axle pivoted on the spindle element, steering wheels having pivotal mountings on the axle, a crank element mounted on the spindle along side the axle mounting, means connecting the crank element and wheel mountings for swinging the latter, and means for turning the crank element.

10. In apparatus of the character set forth, the combination with a supporting frame having a spindle element, a transverse axle pivoted on the spindle element, steering wheels having pivotal mountings on the axle, a crank element mounted on the spindle along side the axle, a link connection between the crank element and one of the mountings, a coupling between the mountings, and means for turning the crank element.

11. In apparatus of the character set forth, the combination with a supporting frame, of a tilting axle pivotally mounted thereon, steering wheels on the axle, and means for turning the wheels including a gear that turns with the axle, a shiftable gear cooperating with the first gear, and means governed by the movement of the axle; for shifting the second gear.

12. In apparatus of the character set forth, the combination with a supporting frame, of a tilting axle pivotally mounted thereon, steering wheels on the axle, and means for turning the wheels including a worm wheel that turns with the axle, a shiftable worm in mesh with the worm wheel, and means governed by the movement of the axle for shifting the worm.

13. In apparatus of the character set forth, the combination with a supporting frame, of a tilting axle pivotally mounted thereon, steering wheels on the axle, and means for turning the wheels including a gear that turns with the axle, a shiftable gear cooperating with the first gear, a device for effecting the shifting of the gear, and means connecting the device and axle for moving it when the axle swings.

14. In apparatus of the character set forth, the combination with a supporting frame, of a tilting axle pivotally mounted thereon, steering wheels on the axle, and means for turning the wheels including a worm wheel that turns with the axle, a shiftable worm in mesh with the worm wheel, a movable housing for the worm, and a gear connection between the housing and axle.

15. In apparatus of the character set forth, the combination with a supporting frame, having a spindle element, of an axle pivotally mounted thereon and having a gear segment at its pivotal mounting, steering wheels having pivotal mountings on the axle, a crank element journaled on the spindle element and having connections with the wheel mountings, said crank element having worm teeth, a shaft disposed transversely to the spindle element, a worm slidably mounted on the shaft and engaged with the worm teeth of the crank element, and a sliding housing for the worm having a rack engaged with the gear segment of the axle.

16. In apparatus of the character set forth, the combination with a supporting frame, of steering wheels for said frame, a motor on said frame, turning mechanism for the steering wheels, means for driving said turning mechanism from the motor including a driving member and a driven member, a clutch for connecting and disconnecting the driving and driven members, manual means for operating the clutch to connect said members, a worm on the driven member, a worm rack engaging the worm, and a clutch actuating device moved by the rack to disconnect the driving and driven members.

17. In apparatus of the character set forth, the combination with a supporting frame, of steering wheels therefor, a motor on said frame, turning mechanism for the steering wheels, means for driving the turning mechanism from the motor, including driving and driven shafts, gearing interposed between said shafts, clutch means for directly connecting the shafts and for connecting them through the gearing, a lever for actuating the clutch means, and means operated by the driven shaft to operate the clutch means in opposition to the lever.

18. In apparatus of the character set forth, the combination with a supporting frame, of an axle pivotally mounted on the supporting frame, steering wheels having pivotal mountings on the axle, means for turning the mountings, said means including connections with the mountings that are pivotally mounted with the axle, a motor on the supporting frame, mechanism for connecting the motor with the turning means, including a clutch, manual means for throwing the clutch into operation, and automatic means for throwing the clutch out of operation.

19. In apparatus of the character set forth, the combination with a supporting frame, of an axle pivotally mounted on the supporting frame, steering wheels having pivotal mountings on the axle, a crank pivotally mounted with the axle and connected to the wheel mountings, a driven shaft geared to the crank, a motor on the frame, a driven shaft driven from the motor, a clutch mechanism for rotating the driven shaft in either direction from the driving shaft, a manual device for throwing the clutch mechanism into operation, and automatic means operated from the driven shaft for throwing the clutch mechanism out of operation.

20. In apparatus of the character set forth, the combination with a supporting frame, of a transverse axle journaled thereon, steering wheels having pivotal mountings on the axle, and mechanism for turning the mountings including a motor, a drive shaft operated by the motor and disposed substantially axially to the pivot axis of the axle, and operating connections between the drive shaft and the wheel mountings.

21. In apparatus of the character set forth, the combination with a supporting frame, of a transverse axle journaled thereon, steering wheels having pivotal mountings on the axle, and mechanism for turning the mountings including a motor, a drive shaft operated by the motor and disposed substantially axially to the pivot axis of the axle, and operating connections between the drive shaft and the wheel mountings, including members that pivot with the axle.

In testimony whereof I affix my signature in the presence of two witnesses.

SYLVESTER H. HUNT.

Witnesses:
ROBERT J. GUNNIS,
H. D. SESH.